Jan. 7, 1936.  W. L. SCRIBNER  2,026,802
BEARING CAGE
Filed Jan. 19, 1935
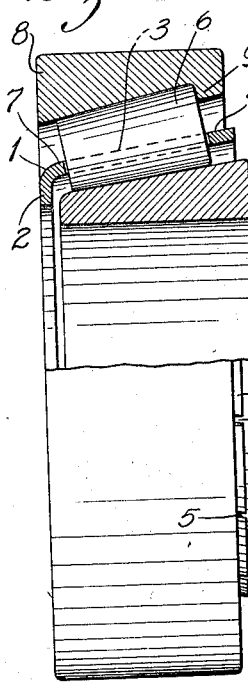
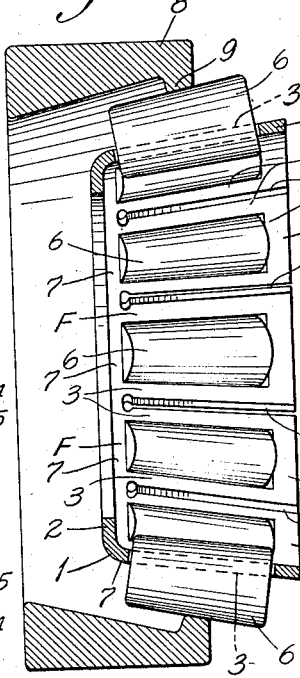
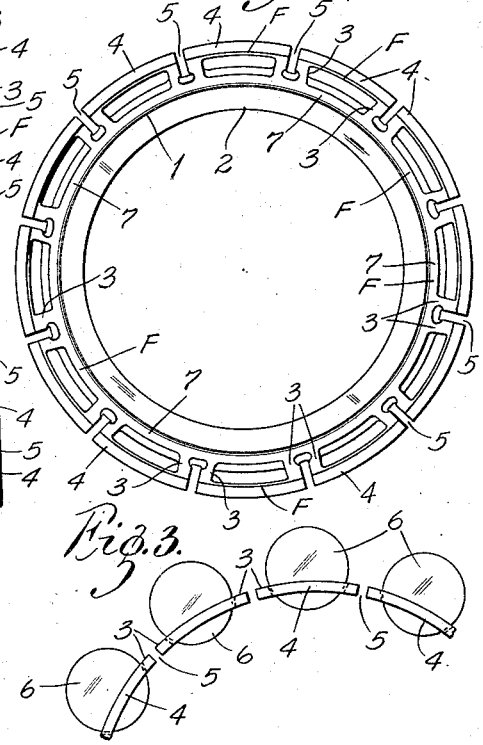
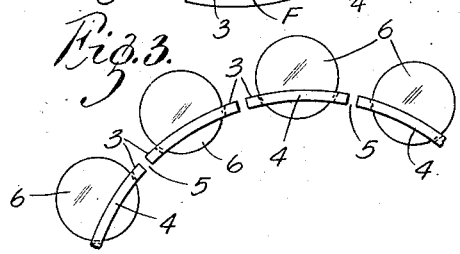
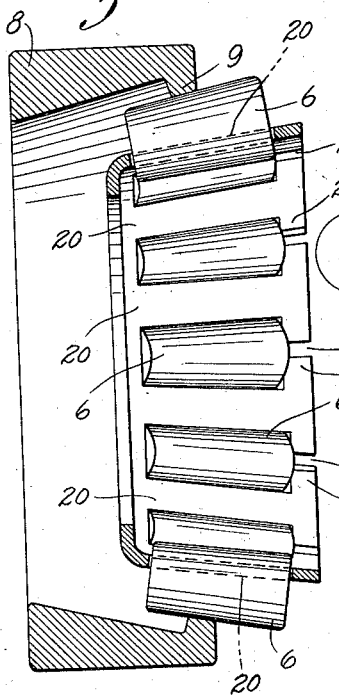
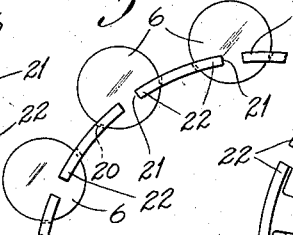
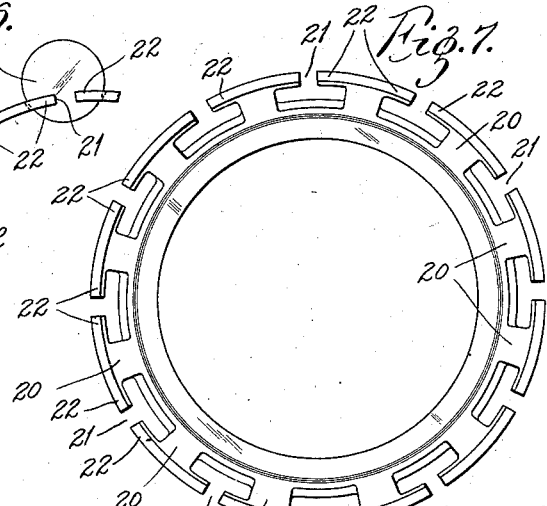
INVENTOR:
William L. Scribner
by Caulter & Gravely
HIS ATTORNEYS.

Patented Jan. 7, 1936

2,026,802

UNITED STATES PATENT OFFICE 2,026,802

BEARING CAGE

William L. Scribner, Canton, Ohio, assignor to The Timken Roller Bearing Company, Canton, Ohio, a corporation of Ohio Application January 19, 1935, Serial No. 2,473

1 Claim. (Cl. 308—218)

My invention relates to cages for roller bearings, particularly taper roller bearings of the ribbed cup type. It has for its principal object a cage that can yield so as to enable the rib of the bearing cup to clear the rollers and which will then resume its normal position, thus dispensing with the special tools commonly required for bowing and then straightening the bridges of the cages in assembling the bearing. The invention consists in the bearing cage and in the parts and combinations and arrangements of parts hereinafter described and claimed.

In the accompanying drawing, which forms part of this specification, and wherein like symbols refer to like parts wherever they occur, Fig. 1 is a part elevation, part longitudinal sectional view of a bearing provided with a cage embodying my invention;

Fig. 2 is a sectional view showing the cage and rollers in partly assembled position in the bearing cup;

Fig. 3 is a fragmentary end view of a portion of the cage with rollers therein,

Fig. 4 is an elevation of the cage, looking at the large end; and

Figs. 5, 6 and 7 are views similar to Figs. 2, 3 and 4, respectively, showing a modified form of cage.

As is well known, the assembling of the taper rollers and cage in a ribbed cup or outer bearing member is attended with considerable difficulty commonly requiring an operation of bowing the bridges so as to distort the cage and permit the rib of the cup to pass over the large end of the rollers mounted in the cage, followed by an operation of straightening the bridges into normal position to hold the rollers in the cup. Both of these operations involve difficulty and expense and require special tools. The cage of the present invention permits the cage and rollers to yield sufficiently to clear the rib, the resilience of the cage itself restoring it to normal position after the rib has been secured and still the cage is sufficiently strong and substantial in construction to withstand heavy service.

The cage shown in Figs. 1 to 4, inclusive, includes a continuous small end ring 1, preferably having an inturned annular end flange 2, conically disposed bridges 3 extending from said small end ring 1 and arcuate strips 4 forming a sectional large end ring. Said bridges are in pairs separated by slots 5, each bridge engaging one roller 6 only. Thus, each roller 6 is completely enclosed in a frame F composed of side bridges 3, an arcuate large end strip 4 that is separate from the other large end strips and an arcuate small end strip 7 that is integral with the small end ring of the cage. All of these frames F are held together in the form of a conical cage by their connection with the small end ring 1 of the cage, but the several frames are obviously capable of radial movement about the small end ring of the cage. The cage is preferably formed, as by stamping, with comparatively wide bridges and a continuous large end ring, and then slotting through the large end ring and longitudinally of the bridges to form the narrow bridges of the finished cage with slots therebetween.

In assembling the cage and rollers in a ribbed bearing cup, the rollers 6 are placed in the cage and the ribbed end of a cup 8 is passed over the small ends of the rollers and the rib 9 forced over the rollers 6 and past the large ends thereof, the frame portions F of the cage swinging inwardly to accommodate this movement. As soon as the rib 9 has cleared the large ends of the rollers 6, the resilience of the metal of the cage restores the cage and rollers to normal position. With ordinary sizes of rollers and cages of ordinary stamped metal, the cups 8 may be forced over the rollers without the assistance of special tools. In the case of large bearings or cages of unusually rigid metal, it may be necessary to use some sort of tool to swing the free portions of the cage inwardly, the release of such tool permitting the cage to assume normal position.

In the modification shown in Figs. 5, 6 and 7, the bridges 20 of the cage are of the usual integral construction instead of being slotted as in Figs. 1 to 4. The large end ring of the cage is slotted as at 21 between bridges so that each bridge has an arcuate strip 22 projecting in each direction from its large end and overlapping portions of two rollers 6. The cage shown in Figs. 5 to 7 is assembled in the same way as has been above described.

The above described cage has the important advantage of permitting easy assembling of the rollers and cage in a ribbed bearing cup without the use of special machinery.

What I claim is:

A conical roller bearing cage of resilient metal comprising an integral small end ring, a sectional large end ring and conically disposed bridges connecting said integral end ring with the respective sections of said large end ring and forming roller pockets therewith, said sectional ring lying wholly in the same conical surface with said small end ring and said bridges.

WILLIAM L. SCRIBNER.